(12) United States Patent
Egnor et al.

(10) Patent No.: US 11,703,875 B2
(45) Date of Patent: *Jul. 18, 2023

(54) BRAKING CONTROL BEHAVIORS FOR AUTONOMOUS VEHICLES

(71) Applicant: Waymo LLC, Mountain View, CA (US)

(72) Inventors: Daniel Trawick Egnor, Palo Alto, CA (US); Nolan McPeek-Bechtold, Belmont, CA (US); James Harris, San Francisco, CA (US); Andrew Barton-Sweeney, Oakland, CA (US); Ruslan Kurdyumov, San Francisco, CA (US); Spencer Alexander, San Francisco, CA (US); Ryan Cash, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/318,159

(22) Filed: May 12, 2021

(65) Prior Publication Data

US 2021/0325896 A1 Oct. 21, 2021

Related U.S. Application Data

(63) Continuation of application No. 16/158,718, filed on Oct. 12, 2018, now Pat. No. 11,036,234.

(51) Int. Cl.
*G05D 1/02* (2020.01)
*B60W 30/09* (2012.01)
*B60T 8/32* (2006.01)
*G05D 1/00* (2006.01)
*B60W 30/095* (2012.01)

(52) U.S. Cl.
CPC ............ *G05D 1/0223* (2013.01); *B60T 8/321* (2013.01); *B60W 30/09* (2013.01); *B60W 30/0953* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| 6,604,042 B2 | 8/2003 | Maruko et al. |
| 8,027,773 B2 | 9/2011 | Ahn |
| 9,569,968 B2 | 2/2017 | Strauss et al. |

(Continued)

*Primary Examiner* — Daniel L Greene
(74) *Attorney, Agent, or Firm* — Botos Churchill IP Law

(57) ABSTRACT

A method and system are provided for controlling braking a vehicle in an autonomous driving mode. For instance, the vehicle is controlled in the autonomous driving mode according to a first braking control mode using a first model to adjust the position of a vehicle relative to an expected position of a current trajectory of the vehicle. Using a second model how close to a maximum deviation threshold the vehicle would come if a maximum braking strength for the vehicle was applied is predicted. The maximum deviation threshold provides an allowed forward deviation from the current trajectory. Based on the prediction, the vehicle is controlled in the autonomous driving mode according to a second braking control mode by automatically applying the maximum braking strength.

22 Claims, 6 Drawing Sheets

(56) References Cited

U.S. PATENT DOCUMENTS

| | | |
|---|---|---|
| 10,059,334 B1 | 8/2018 | Zhu et al. |
| 2010/0209888 A1 | 8/2010 | Huang et al. |
| 2011/0166723 A1 | 7/2011 | Valentova et al. |
| 2012/0109610 A1* | 5/2012 | Anderson ......... B60W 50/0098 703/7 |
| 2013/0226408 A1 | 8/2013 | Fung et al. |
| 2014/0257603 A1 | 9/2014 | McKeown et al. |
| 2015/0028666 A1 | 1/2015 | Linhoff |
| 2015/0073662 A1 | 3/2015 | Schmüdderich et al. |
| 2015/0165905 A1 | 6/2015 | Filev et al. |
| 2015/0360687 A1* | 12/2015 | Meyer ................... B60W 10/20 701/70 |
| 2017/0015288 A1 | 1/2017 | Coelingh et al. |
| 2017/0361848 A1* | 12/2017 | Noto ..................... B60W 10/18 |
| 2018/0229705 A1 | 8/2018 | Farres et al. |
| 2020/0086844 A1 | 3/2020 | Vollert et al. |

\* cited by examiner

BRAKING CONTROL BEHAVIORS FOR AUTONOMOUS VEHICLES

CROSS REFERENCE TO RELATED APPLICATIONS

The present application is a continuation of U.S. patent application Ser. No. 16/158,718, filed Oct. 12, 2018, which issued as U.S. Pat. No. 11,036,234 on Jun. 15, 2021, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a pickup or destination location, and the vehicle maneuvers itself to that location by controlling various systems of the vehicles, including acceleration and deceleration (braking) systems of the vehicle.

BRIEF SUMMARY

One aspect of the disclosure provides a method of controlling braking a vehicle in an autonomous driving mode. The method includes controlling, by one or more processors, the vehicle in the autonomous driving mode according to a first braking control mode using a first model to adjust a position of a vehicle relative to an expected position of a current trajectory of the vehicle; predicting, by the one or more processors, using a second model how close to a maximum deviation threshold the vehicle would come if a maximum braking strength for the vehicle was applied, wherein the maximum deviation threshold provides an allowed forward deviation from the current trajectory; and based on the prediction, controlling, by the one or more processors, the vehicle in the autonomous driving mode according to a second braking control mode by automatically applying the maximum braking strength.

In one example, the predicting is further based on a current location of the vehicle, a current acceleration of the vehicle, and a current speed of the vehicle. In another example, the predicting is further based on estimated brake performance for the vehicle, acceleration delays, and application rate. In another example, the first model is a gain-based model. In another example, the maximum braking strength is applied until a deviation value from the current trajectory is zero. In another example, maximum braking strength is applied until a deviation value from the current trajectory is zero. In another example, the current trajectory is updated over time. In another example, the method also includes determining that the predicting indicates that the vehicle would meet the maximum deviation threshold, and controlling the vehicle according to the second braking control mode is further based on the determination that the predicting indicates that the vehicle would meet the maximum deviation threshold. In another example, the method also includes, after controlling the vehicle according to the second braking control mode, controlling the vehicle in the autonomous driving mode according to the first braking control mode.

Another aspect of the disclosure provides a system for controlling braking a vehicle in an autonomous driving mode. The system includes one or more processors configured to: control the vehicle in the autonomous driving mode according to a first braking control mode using a first model to adjust the position of a vehicle relative to an expected position of a current trajectory of the vehicle; predict using a second model how close to a maximum deviation threshold the vehicle would come if a maximum braking strength for the vehicle was applied, wherein the maximum deviation threshold provides an allowed forward deviation from the current trajectory; and based on the prediction, control the vehicle in the autonomous driving mode according to a second braking control mode by automatically applying the maximum braking strength.

In one example, the system also includes the vehicle. In another example, the one or more processors are further configured to predict how close further based on a current location of the vehicle, a current acceleration of the vehicle, and a current speed of the vehicle. In another example, the one or more processors are further configured to predict how close further based on estimated brake performance for the vehicle, acceleration delays, and application rate. In another example, the first model is a gain-based model. In another example, the one or more processors are further configured to apply the maximum braking strength until a deviation value from the current trajectory is zero. In another example, the one or more processors are further configured to apply the maximum braking strength until a deviation value from the current trajectory is zero. In another example, the current trajectory is updated over time. In another example, the one or more processors are further configured to determine that the predicting indicates that the vehicle would meet the maximum deviation threshold, and to control the vehicle according to the second braking control mode further based on the determination that the predicting indicates that the vehicle would meet the maximum deviation threshold. In another example, the one or more processors are further configured to, after controlling the vehicle according to the second braking control mode, control the vehicle in the autonomous driving mode according to the first braking control mode.

A further aspect of the disclosure provides a non-transitory computer readable recording medium on which instructions are stored, the instructions, when executed by one or more processors, cause the processors to perform a method of controlling braking a vehicle in an autonomous driving mode. The method includes controlling the vehicle in the autonomous driving mode according to a first braking control mode using a first model to adjust a position of a vehicle relative to an expected position of a current trajectory of the vehicle; predicting using a second model how close to a maximum deviation threshold the vehicle would come if a maximum braking strength for the vehicle was applied, wherein the maximum deviation threshold provides an allowed forward deviation from the current trajectory; and based on the prediction, controlling the vehicle in the autonomous driving mode according to a second braking control mode by automatically applying the maximum braking strength.

DETAILED DESCRIPTION

Overview

Figure 1:
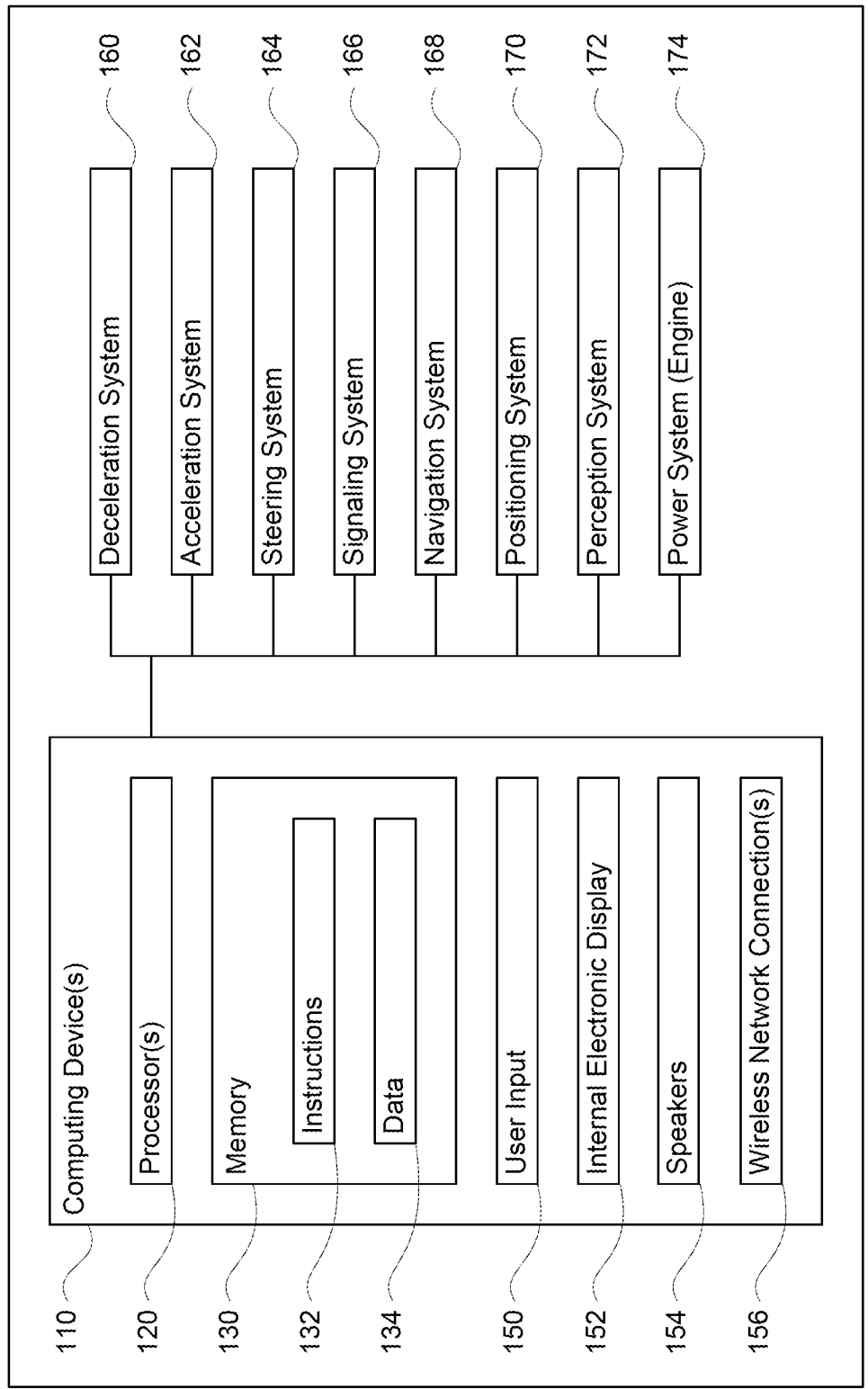
FIG. 1 is a functional diagram of an example vehicle in accordance with an exemplary embodiment.

The technology relates to controlling a vehicle in an autonomous driving mode and specifically to braking control. For instance, autonomous vehicles may follow a trajectory that defines locations at which the vehicle should be located at future times. These trajectories are generated as "desired paths" in order to avoid obstacles, obey laws and generally drive safely and effectively. The vehicle's computing devices operate to manage steering, powertrain and braking in order to cause the vehicle to follow the trajectory. These computing devices may rely on feedback from the vehicles sensors in order to determine whether the vehicle is actually following the current trajectory.

For instance, when controlling the vehicle in an autonomous driving mode, the computing devices may receive feedback from various sensors of the vehicle, such as acceleration, speed, and position sensors, in order to determine the current acceleration, speed and position of the vehicle. These values may then be compared to the values of the current trajectory in order to determine how closely the vehicle is following the current trajectory. If the vehicle is not exactly following the current trajectory, the computing devices may adjust its control the vehicle in order to get back onto the current trajectory.

In operation, the computing devices use a first model that relies on "gains" to control how much the vehicle's acceleration or deceleration is adjusted. These gains may be independent of the actual distance that the vehicle has veered from the current trajectory; thus, the same response would result for any distance.

In addition to using the first model in a first braking control mode, the computing devices may rely on a second model in a second braking control mode which is dependent upon the magnitude of the deviation from the current trajectory. The second model may be used to predict what would happen if the brakes were applied at maximum braking strength to achieve maximum deceleration of the vehicle. This maximum braking strength may correspond to a maximum amount of braking power available for the brakes of the vehicle and may be significantly more than the braking that would otherwise be applied based on the aforementioned gains using the primary model. In other words, the second model may provide an estimate of how close to a maximum deviation threshold the vehicle would come if the maximum braking strength was applied. The maximum deviation threshold may be set for allowed forward deviation from the current trajectory when the vehicle would be too far ahead of intended position.

If the second model indicates that the vehicle would meet, or even come close, to the maximum deviation threshold, the computing devices may enter the second braking control mode and automatically apply the maximum braking strength. The value for how close is too close may be depend upon safety margins for the vehicle as well as how confident the vehicle's computing devices are in sensor data and measurements from the perception system, estimates of the vehicle's braking ability, etc. Because the model takes into account the current conditions of the vehicle and not simply how close the vehicle is physically to the maximum deviation threshold, this avoids applying the maximum braking in situations in which the vehicle is close to the maximum deviation threshold but already slowing down.

In the event that the maximum braking strength is applied, this may continue until the vehicle's forward deviation from the current trajectory is zero or less than zero. Alternatively, the maximum braking strength may be applied for only a predetermined period of time or until some desired deceleration is reached. Thereafter, the vehicle may return to using the first model.

The features described herein may allow the vehicle's computing devices to utilize gains to be adjusted for comfort and smooth driving under normal circumstances, but if for some reason the vehicle is likely to approach the maximum deviation threshold (or rather, a safety limit), maximum braking is applied to ensure the safety limit is not violated. In addition, the use of the predictive model ensures that maximum braking is applied as soon as necessary, but no sooner.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160 (for instance, including the features connected or otherwise attached to the brake pedal of the vehicle), acceleration system 162 (for instance, including the features connected or otherwise attached to the accelerator pedal of the vehicle), steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. For instance, the computing devices 110 may generate trajectories for the vehicle 100 to follow and control the vehicle according to the trajectory by sending commands to the deceleration system 160 (to control braking power and accordingly, deceleration) as well as acceleration system 162 (to control acceleration and changes in acceleration). Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 2:
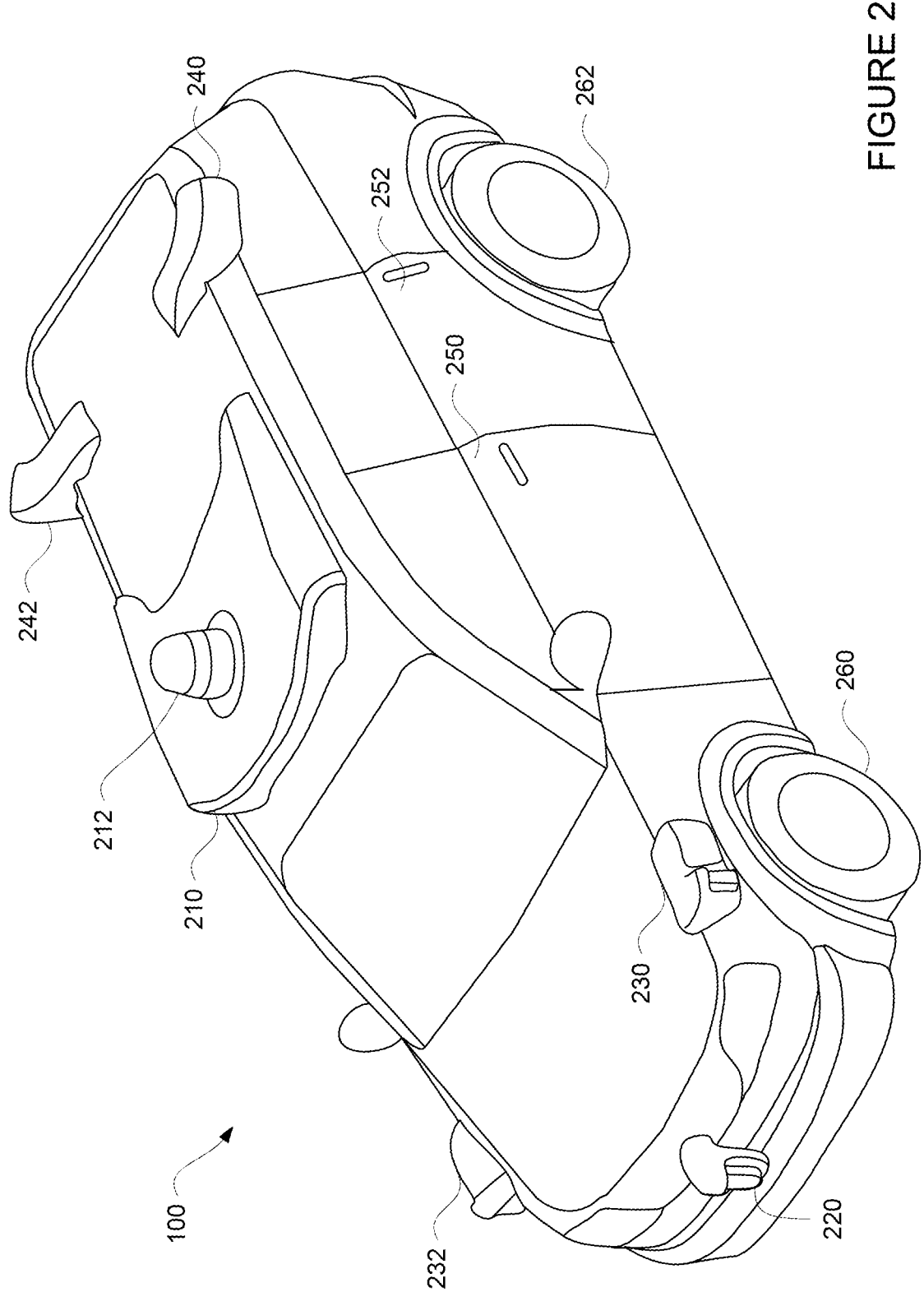
FIG. 2 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210. Vehicle 100 also includes many features of a typical passenger vehicle such as doors 250, 252, wheels 260, 262, etc.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, the computing devices 110 may use the routing system to determine a route to a destination. The computing devices 110 may then periodically generate trajectories, for instance every 0.1 times per second or more or less, for the vehicle to follow for some time and distance into the future in order to follow the route to the destination. As noted above, these trajectories are generated as "desired paths" in order to avoid obstacles, obey laws and generally drive safely and effectively. Each trajectory may define various requirements for the vehicle's acceleration, speed, and position at different times along the trajectory. In this regard, the trajectory may include both geometry and speed/acceleration components. The computing devices 110 may operate to manage steering, powertrain and braking in order to cause the vehicle to follow the trajectory. The computing devices 110 may receive feedback from the vehicles sensors including sensors of and/or the perception system 172 and the positioning system 170. This feedback may include information such as the current acceleration, speed, and position of the vehicle.

This information may then be compared to those of the current trajectory, or rather the trajectory that was last generated by the vehicle's computing devices 110 and that the vehicle 100 is currently following. The comparison may be used to determine how closely the vehicle is following the current trajectory.

If the vehicle is not exactly following the current trajectory, the computing devices 110 may adjust control the vehicle 100 in order to get back onto the current trajectory. Over time, these adjustments may keep the vehicle on the current trajectory which of course, also changes over time.

Figure 3:
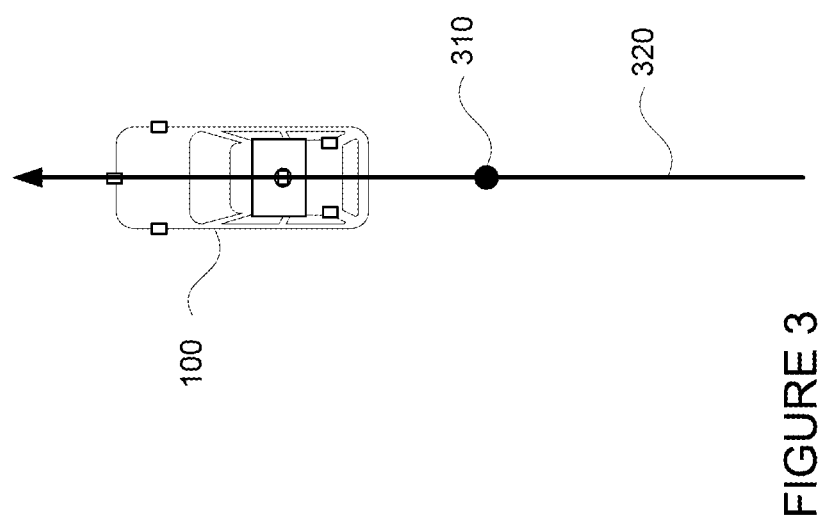
FIG. 3 is an example of a current trajectory of a vehicle and data in accordance with aspects of the disclosure.

For instance, turning to FIG. 3, if the vehicle 100 is too far ahead of its expected position 310 on a current trajectory 320 (or going faster than desired), there may be forward deviation. As such, additional braking or deceleration may be applied by the computing devices 110 via commands to the deceleration system 160 to apply additional braking power. This may cause the vehicle to move towards the expected position 310, which of course, may change over time given the current trajectory and as the current trajectory is updated to a new trajectory.

Figure 4:
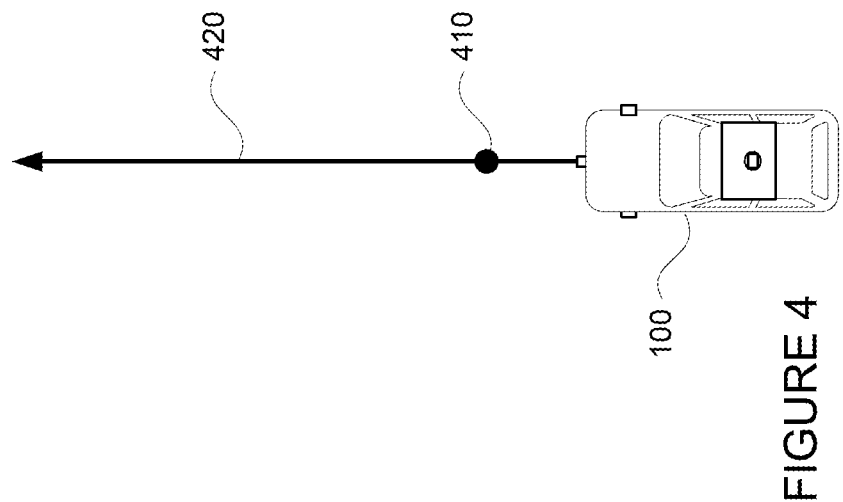
FIG. 4 is another example of a current trajectory of a vehicle and data in accordance with aspects of the disclosure.

Turning to FIG. 4, if the vehicle 100 is too far behind its expected position 410 on a current trajectory 420 (or going slower than desired), there may be reverse deviation. In such situations, less braking may be applied by the computing devices 110, for instance, by controlling acceleration system 162 and/or deceleration system 160 to reduce braking power and/or increase power to the power system 164. This may cause the vehicle to move towards the expected position 410, which of course, may change over time as noted above.

Similarly, if the vehicle's actual position is the same as or otherwise corresponds to where the vehicle should be positioned according to the current trajectory, but the vehicle's actual acceleration or speed are not the same what the vehicle's acceleration and speed should be according to the current trajectory, the computing devices 110 may also control the vehicle's actual acceleration and speed, for instance via commands to the acceleration system 162 and/or deceleration system 160. This may cause the vehicle to move towards the acceleration and speed expected from the current trajectory.

To achieve these adjustments, the computing devices 110 may use a first model that relies on "gains" to control how much the vehicle's acceleration or deceleration is adjusted by the computing devices 110 by controlling commands deceleration system 160, acceleration system 162, and/or power system 174. These gains may be independent of the actual distance that the vehicle has veered from the current trajectory. Thus, the same response would result for any amount of difference between the vehicle's measured acceleration, speed and location and the current trajectory. Higher gains that result in large, quick responses, may lead to a more precise but jerky experience as the vehicle reacts strongly to small amounts of deviation from the intended position. In some instances, such as where the vehicle is going downhill, this can result in wheel slipping and skidding. Low gains that result in small, slower response may be smoother but may allow more deviation to accumulate (i.e. greater differences from the current trajectory). The gain may be tuned in order to find some appropriate and comfortable middle ground.

Figure 5:
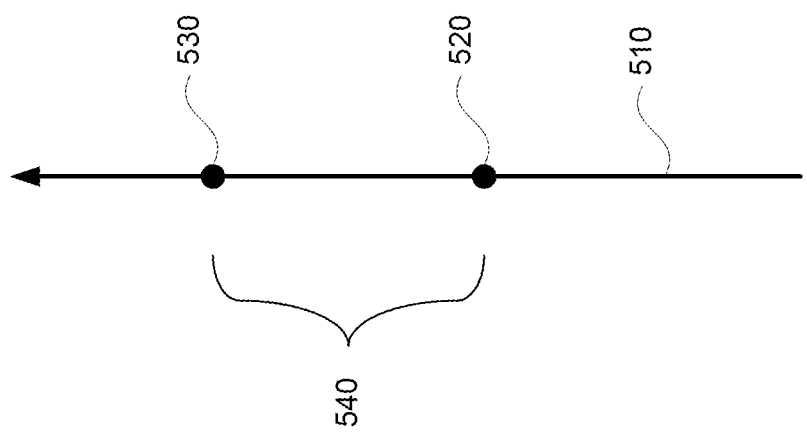
FIG. 5 is another example of a current trajectory of a vehicle and data in accordance with aspects of the disclosure.

In order to address these issues, in addition to using the first model in a first braking control mode, the computing devices may rely on a second model in a second braking control mode which is dependent upon the magnitude of the deviation from the trajectory. For instance, as shown in FIG. 5, a maximum deviation threshold 530 may be set for allowed forward deviation from the current trajectory 510 when the vehicle would be too far ahead of its expected position 520 on the current trajectory.

This maximum deviation threshold may be set based on safety margins. For instance, if the vehicle does not want to come any closer than some predetermined distance to another object the maximum deviation threshold may be selected to be equal to or less than this distance. For example, if the predetermined distance is 0.5 meters, the maximum deviation threshold should be equal to or less than 0.5 meters, such as 0.6 meters or more or less. Turning to FIG. 5, this distance may correspond to the distance 540 between the expected position 520 on the current trajectory 510 and the maximum deviation threshold 530.

In addition, rather than being a fixed value, the maximum deviation threshold may be determined in real time based on various factors relating to the type of situation in which the vehicle is currently in such as an amount of headroom available, a type of the object in front of the vehicle (there would be greater risk for more vulnerable road users like pedestrians and bicyclists, so the vehicle should be more conservative about its position), the relative velocity of objects in front of the vehicle (there would be greater jerk if the vehicle needed to actively stop for objects as opposed to if the vehicle were following objects at the same speed), etc. For instance, the maximum deviation threshold may be smaller distance or time if the object in front of the vehicle is a bicyclist and a greater distance or time if the object in front of the vehicle is another vehicle, as a collision with a bicyclist is likely to be more severe than a collision with another vehicle and because the behavior of bicyclists is more unpredictable than the behavior of other vehicles. A similar comparison may be made between pedestrians and bicyclists as well as pedestrians and vehicles. For another instance, the maximum deviation threshold may be smaller distance or time if the object in front of the vehicle is traveling at higher relative velocity and a greater distance or time if the object in front of the vehicle is traveling at a lower relative velocity (i.e. closer to the velocity of the autonomous vehicle), as a higher speed collision is likely to be more severe than a lower speed collision.

Again, while controlling the vehicle in an autonomous driving mode, the computing devices 110 may receive feedback from the various sensors and/or systems of the vehicle, such as acceleration, speed, and position sensors, in order to determine the current acceleration, speed and position of the vehicle. This information, as well as the current trajectory of the vehicle 100 may be input into the second model in order to predict what would happen if the brakes were applied at maximum strength to achieve maximum deceleration of the vehicle.

This maximum strength may correspond to a maximum amount of braking power available for the brakes of the vehicle and may be significantly more than the braking that would otherwise be applied based on the aforementioned gains using the first model. This may or may not include a parking brake as the parking brake may be liable to cause skidding. In any event, the model may provide an estimate of how close to the maximum deviation threshold the vehicle would come if the maximum strength was applied.

For instance, the vehicle 100 may be following a trajectory with a plurality of physical locations and corresponding times where if the vehicle is doing so accurately, the vehicle will be at each physical location at the corresponding time. At any given time, the computing devices 110 are able to determine the vehicle's position as well as a position where the vehicle should be according to the trajectory. From this, the position error (or deviation) along that trajectory may be determined. This second model can be used to look at every point in the future and calculate what the vehicle's position error would be if the vehicle started braking as hard as possible immediately. In this calculation, the computing devices 110 also are able to determine the vehicle's current speed, acceleration, maximum strength of braking for the vehicle, that it takes a certain number of milliseconds for the brakes to start building pressure to decelerate the vehicle, that once the brakes begin to decelerate the vehicle, the deceleration increases at a certain rate, and what the max deceleration of the vehicle is.

Figure 6:
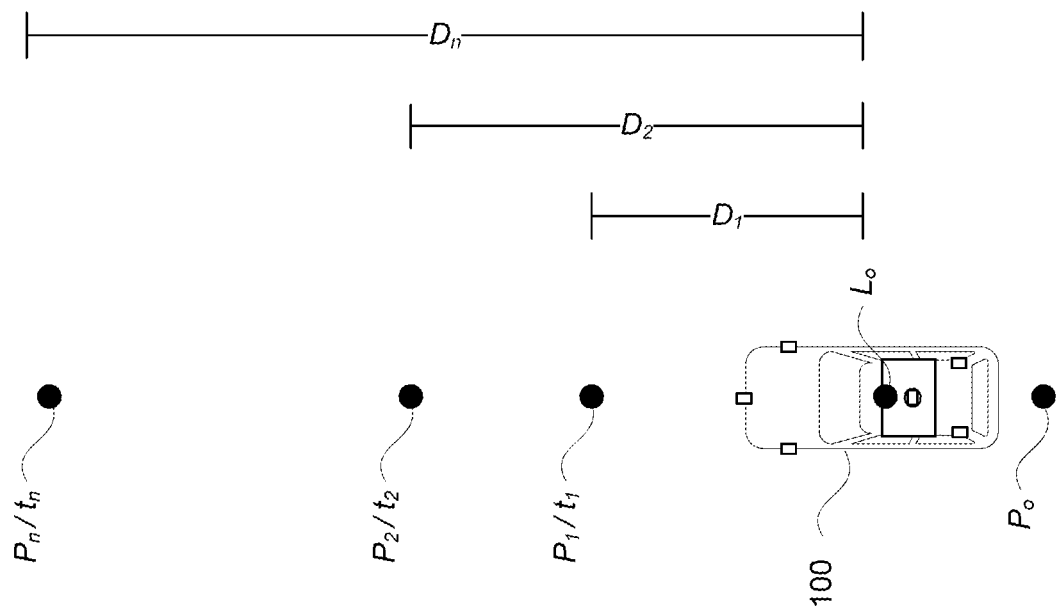
FIG. 6 is an example diagram of a vehicle and data in accordance with aspects of the disclosure.

As one example, referring to FIG. 6, L may represent the location of the vehicle 100 at a time $t_0$ while $P_0$ may represent the location where the vehicle should be at time to according to its current trajectory. $V_0$, $A_0$, and $J_0$ represent the vehicle's velocity, acceleration, and jerk at time $t_0$, respectively. $P_1$ represents a future location of the vehicle at a time $t_1$ according to the current trajectory, $P_2$ represents a future location of the vehicle at a time $t_2$ according to the current trajectory, and $P_n$ represents a future location of the vehicle at a time $t_n$ according to the current trajectory. $D_1$ represents a distance from the current location L to the future location $P_1$, $D_2$ represents a distance from the current location L to the future location $P_2$, and $D_n$ represents a distance from the current location L to the future location $P_n$. As such, the location $L_1$ of the vehicle 100 at time $t_1$, if the vehicle were to immediately start braking at the maximum amount of braking power may be determined from the equation:

$$L_1 = V_o(t_1 - t_0) + \frac{1}{2}A_o(t_1 - t_0)^2 + \frac{1}{6}J_0(t_1 - t_0)^3 + \frac{1}{2}(A_{max\,brake})t_{max\,brake}^2 + \frac{1}{6}J_{max}t_{jerk}^3$$

where, $A_{max\,brake}$, is the maximum amount of braking power, $t_{max\,brake}=t_1-t_0-t_{latency}-t_{jerk}$, $t_{latency}$=the time for the vehicle's brakes to respond to a command from the computing devices 110 to apply the maximum amount of braking power, and $t_{jerk}=(A_{maxbrake}-A_0)/J_{max}$. In this regard, if $L_1-P_1+E_0\geq$ the maximum deviation threshold, then the maximum amount of braking power is applied.

The second model may be adjusted for different situations based on a combination of the vehicle's speed, current acceleration, current estimated brake performance (how quickly can the brakes decelerate the vehicle at maximum strength), acceleration delays (to send the command), application rate (how fast the brake is able to build braking), maximum deceleration, and other factors. For instance, depending upon the situation, the maximum amount of braking power of the vehicle, the maximum amount of jerk (derivative of acceleration) of the vehicle, and the latency of the vehicle may be adjusted. These parameters may be adjusted whenever something in the environment or the vehicle would cause those parameters to change. For example, if the roads are determined by the computing devices 100 to be wet or icy, the maximum braking power would change, if the brake fluid is very cold, the jerk would change, etc.

If the output of the model indicates that the vehicle would meet, the maximum deviation threshold, the computing devices 110 may enter the second braking control mode and automatically apply the maximum braking strength by sending corresponding commands to control the deceleration system 160 accordingly. In some instances, if the output of the model indicates that the vehicle would not necessarily meet, but still come close to the maximum deviation threshold (such as within 10 centimeters or more or less), the computing devices 110 may enter the second braking control mode and automatically apply the maximum braking strength. The value for how close is too close may be tuned based upon safety margins for the vehicle as well as how confident the vehicle's computing devices are in sensor data and measurements from the perception system, estimates of the vehicle's braking ability, etc. However, because the model takes into account the current conditions of the vehicle (including speed and acceleration) and not simply how close the vehicle is physically to the maximum deviation threshold, this avoids applying the maximum braking in situations in which the vehicle is close to the maximum deviation threshold but already slowing down.

In the event that the maximum braking strength is applied, this may continue until the vehicle's forward deviation from the current trajectory (or a current, updated trajectory) is zero (or less than zero such that there is reverse deviation). Alternatively, the maximum braking strength may be applied for only a predetermined period of time or until some desired amount of deceleration is reached. Thereafter, the computing devices 110 may return to using the first model in order to make adjustments to ensure that the vehicle is staying as close as possible to the current trajectory.

Figure 7:
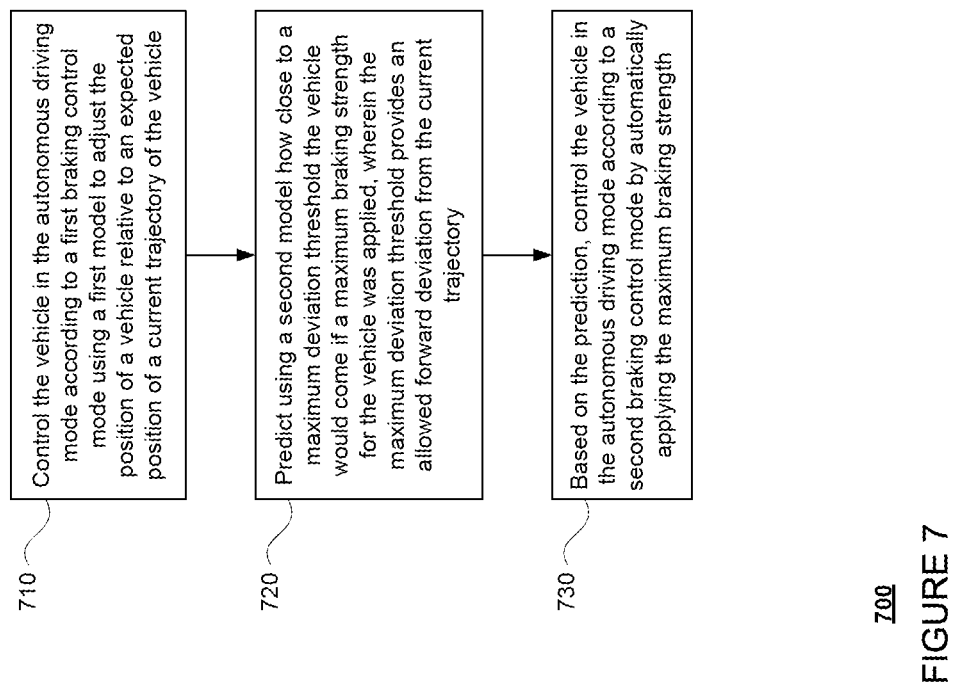
FIG. 7 is an example flow diagram in accordance with aspects of the disclosure.

FIG. 7 includes an example flow diagram 700 of some examples of controlling braking a vehicle in an autonomous driving mode, which may be performed by one or more processors such as processors of computing devices 110. In this example, at block 710, the vehicle is controlled in the autonomous driving mode according to a first braking control mode using a first model to adjust the position of a vehicle relative to an expected position of a current trajectory of the vehicle. At block 720, using a second model how close to a maximum deviation threshold the vehicle would come if a maximum braking strength for the vehicle was applied is predicted. This maximum deviation threshold provides an allowed forward deviation from the current trajectory. At block 730, based on the prediction, the vehicle is controlled in the autonomous driving mode according to a second braking control mode by automatically applying the maximum braking strength.

The features described herein may allow the vehicle's computing devices to utilize gains to be adjusted for comfort and smooth driving under normal circumstances, but if for some reason the vehicle is likely to approach the maximum deviation threshold (or rather, a safety limit), maximum braking is applied to ensure the safety limit is not violated. In addition, the use of the predictive model ensures that maximum braking is applied as soon as necessary, but no sooner.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling braking a vehicle in an autonomous driving mode, the method comprising:
controlling, by one or more processors, the vehicle in the autonomous driving mode according to a first braking control mode using a first model to adjust a position of a vehicle relative to an expected position of a current trajectory of the vehicle;
predicting, by the one or more processors, how close to a maximum deviation threshold the vehicle would come if a maximum braking strength for the vehicle was applied according to a second braking control mode;
determining, by the one or more processors, the maximum deviation threshold based on an object in front of the vehicle; and
based on the prediction, controlling, by the one or more processors, the vehicle in the autonomous driving mode according to the second braking control mode.

2. The method of claim 1, wherein the predicting is further based on a current location of the vehicle, a current acceleration of the vehicle, and a current speed of the vehicle.

3. The method of claim 1, wherein the predicting is further based on estimated brake performance for the vehicle, acceleration delays, and application rate.

4. The method of claim 1, wherein controlling the vehicle according to the second braking control mode is by automatically applying the maximum braking strength.

5. The method of claim 4, wherein the maximum braking strength is applied until a deviation value from the current trajectory is zero.

6. The method of claim 4, wherein the maximum braking strength is applied until a deviation value from the current trajectory is less than zero.

7. The method of claim 1, further comprising determining that the predicting indicates that the vehicle would meet the maximum deviation threshold, and wherein controlling the vehicle according to the second braking control mode is further based on the determination that the predicting indicates that the vehicle would meet the maximum deviation threshold.

8. The method of claim 1, wherein the object is a pedestrian, a bicyclist, or another vehicle.

9. The method of claim 8, wherein determining the maximum deviation threshold includes selecting a predetermined maximum deviation threshold from a plurality of predetermined maximum deviation thresholds for different objects, and wherein the maximum deviation threshold of the plurality of predetermined maximum deviation thresholds for the pedestrian is smaller than the maximum deviation threshold of the plurality of predetermined maximum deviation thresholds for the bicyclist.

10. The method of claim 9, wherein the maximum deviation threshold for the bicyclist is smaller than the maximum deviation threshold for the another vehicle.

11. A system for controlling braking a vehicle in an autonomous driving mode, the system comprising:
one or more processors configured to:
control the vehicle in the autonomous driving mode according to a first braking control mode using a first model to adjust the position of a vehicle relative to an expected position of a current trajectory of the vehicle;
predict how close to a maximum deviation threshold the vehicle would come if a maximum braking strength for the vehicle was applied according to a second braking control mode;
determine the maximum deviation threshold based on an object in front of the vehicle; and
based on the prediction, control the vehicle in the autonomous driving mode according to the second braking control mode.

12. The system of claim 11, further comprising the vehicle.

13. The system of claim 11, wherein the one or more processors are further configured to predict how close further based on a current location of the vehicle, a current acceleration of the vehicle, and a current speed of the vehicle.

14. The system of claim 11, wherein the one or more processors are further configured to predict how close further based on estimated brake performance for the vehicle, acceleration delays, and application rate.

15. The system of claim 11, wherein the one or more processors are further configured to control the vehicle according to the second braking control mode by automatically applying the maximum braking strength.

16. The system of claim 15, wherein the one or more processors are further configured to apply the maximum braking strength until a deviation value from the current trajectory is zero.

17. The system of claim 15, wherein the one or more processors are further configured to apply the maximum braking strength until a deviation value from the current trajectory is less than zero.

18. The system of claim 11, wherein the one or more processors are further configured to determine that the predicting indicates that the vehicle would meet the maximum deviation threshold, and to control the vehicle according to the second braking control mode further based on the determination that the predicting indicates that the vehicle would meet the maximum deviation threshold.

19. The system of claim 11, wherein the object is a pedestrian, a bicyclist, or another vehicle.

20. The system of claim 19, wherein determining the maximum deviation threshold includes selecting a predetermined maximum deviation threshold from a plurality of predetermined maximum deviation thresholds for different objects, and wherein the maximum deviation threshold of the plurality of predetermined maximum deviation thresholds for the pedestrian is smaller than the maximum deviation threshold of the plurality of predetermined maximum deviation thresholds for the bicyclist.

21. The system of claim 20, wherein the maximum deviation threshold for the bicyclist is smaller than the maximum deviation threshold for the another vehicle.

22. A non-transitory computer readable recording medium on which instructions are stored, the instructions, when executed by one or more processors, cause the processors to perform a method of controlling braking a vehicle in an autonomous driving mode, the method comprising:
controlling the vehicle in the autonomous driving mode according to a first braking control mode using a first model to adjust a position of a vehicle relative to an expected position of a current trajectory of the vehicle;
predicting how close to a maximum deviation threshold the vehicle would come if a maximum braking strength for the vehicle was applied according to a second braking control mode;
determining the maximum deviation threshold based on an object in front of the vehicle; and
based on the prediction, controlling the vehicle in the autonomous driving mode according to the second braking control mode.

* * * * *